US012792684B2

(12) United States Patent
Eckowitz

(10) Patent No.: US 12,792,684 B2
(45) Date of Patent: Nov. 10, 2026

(54) GRAPH-BASED STATE MANAGEMENT IN CLIENT-SIDE WEB APPLICATIONS

(71) Applicant: IP Holdings 2017 LLC, New York, NY (US)

(72) Inventor: Jordan Leigh Eckowitz, Chicago, IL (US)

(73) Assignee: IP HOLDINGS 2017 LLC, New York, NY (US)

( * ) Notice: Subject to any disclaimer, the term of this patent is extended or adjusted under 35 U.S.C. 154(b) by 0 days.

(21) Appl. No.: 18/679,140

(22) Filed: May 30, 2024

(65) Prior Publication Data

US 2025/0371098 A1 Dec. 4, 2025

(51) Int. Cl.
*G06F 16/958* (2019.01)
*H04L 67/02* (2022.01)

(52) U.S. Cl.
CPC ............ *G06F 16/986* (2019.01); *H04L 67/02* (2013.01)

(58) Field of Classification Search
None
See application file for complete search history.

(56) References Cited

U.S. PATENT DOCUMENTS 9,037,636 B2 5/2015 Kern
9,398,081 B2 7/2016 Li
11,455,364 B2 9/2022 Finkelshtein
11,593,449 B1 2/2023 Bansal
11,809,843 B2 11/2023 Shek
2008/0071801 A1* 3/2008 Lucco ................. G06F 16/9027
2009/0235181 A1* 9/2009 Saliba ................... G06F 40/197 715/753
2012/0197870 A1* 8/2012 Simon ............... G06F 16/24534 707/759
2016/0057733 A1* 2/2016 Grandillo .............. H04W 40/04 370/312
2017/0053294 A1* 2/2017 Yang .................. G06Q 20/4016
2017/0235466 A1* 8/2017 Tanwir .................. G06F 3/0481 715/738

(Continued)

FOREIGN PATENT DOCUMENTS

CN 117785992 A 3/2024
JP 2005208759 A 8/2005

OTHER PUBLICATIONS

Tily et al., "GO Visual Browser," 2011 IEEE Fifth International Conference on Semantic Computing, Palo Alto, CA, USA, 2011, pp. 201-204. (Year: 2011).*

(Continued)

*Primary Examiner* — Tuyetlien T Tran
(74) *Attorney, Agent, or Firm* — BRYAN CAVE LEIGHTON PAISNER LLP

(57) ABSTRACT

A computer-implemented method including, upon launch of a browser session on a client-side web application, obtaining state data in a first relational structure from a database of a server. The method also can include generating, at the client-side web application, a graph comprising vertices and edges to represent the state data in a second relational structure. The second relational structure of the graph can be different from the first relational structure. The client-side web application can be configured to perform data operations on the state data using the graph. Other embodiments are described.

20 Claims, 4 Drawing Sheets

(56) References Cited

U.S. PATENT DOCUMENTS

| | | | | |
|---|---|---|---|---|
| 2020/0167666 | A1 | 5/2020 | Van Rotterdam | |
| 2021/0073284 | A1 | 3/2021 | Hunter | |
| 2021/0182315 | A1* | 6/2021 | Haprian | G06F 16/9024 |
| 2021/0241167 | A1* | 8/2021 | Li | G06F 18/10 |
| 2025/0265238 | A1* | 8/2025 | Lee | G06F 16/2358 |

OTHER PUBLICATIONS

"Common Data Model," pp. 1-5, Apr. 6, 2022, retrieved from https://learn.microsoft.com/en-us/common-data-model/ (Year: 2022).*

* cited by examiner

GRAPH-BASED STATE MANAGEMENT IN CLIENT-SIDE WEB APPLICATIONS

TECHNICAL FIELD

This disclosure relates generally the field of web application development, and more specifically, to the management of application state using graphs in client-side web applications.

BACKGROUND

In the field of web application development, management of state data has become increasingly important in handling dynamic data interactions within web applications. Modern web applications generally provide interactive user interfaces that store state data. The state of an application refers to the condition or status of the application at any given point in time. It includes the data being displayed on the user interface, user inputs, and other dynamic factors that affect the behavior of the web application. As the size of a web application becomes large and complex, there are challenges scaling and handling the structure of the data, especially when changes to the data model are desired.

BRIEF DESCRIPTION OF THE DRAWINGS

To facilitate further description of the embodiments, the following drawings are provided in which.

Figure 1:
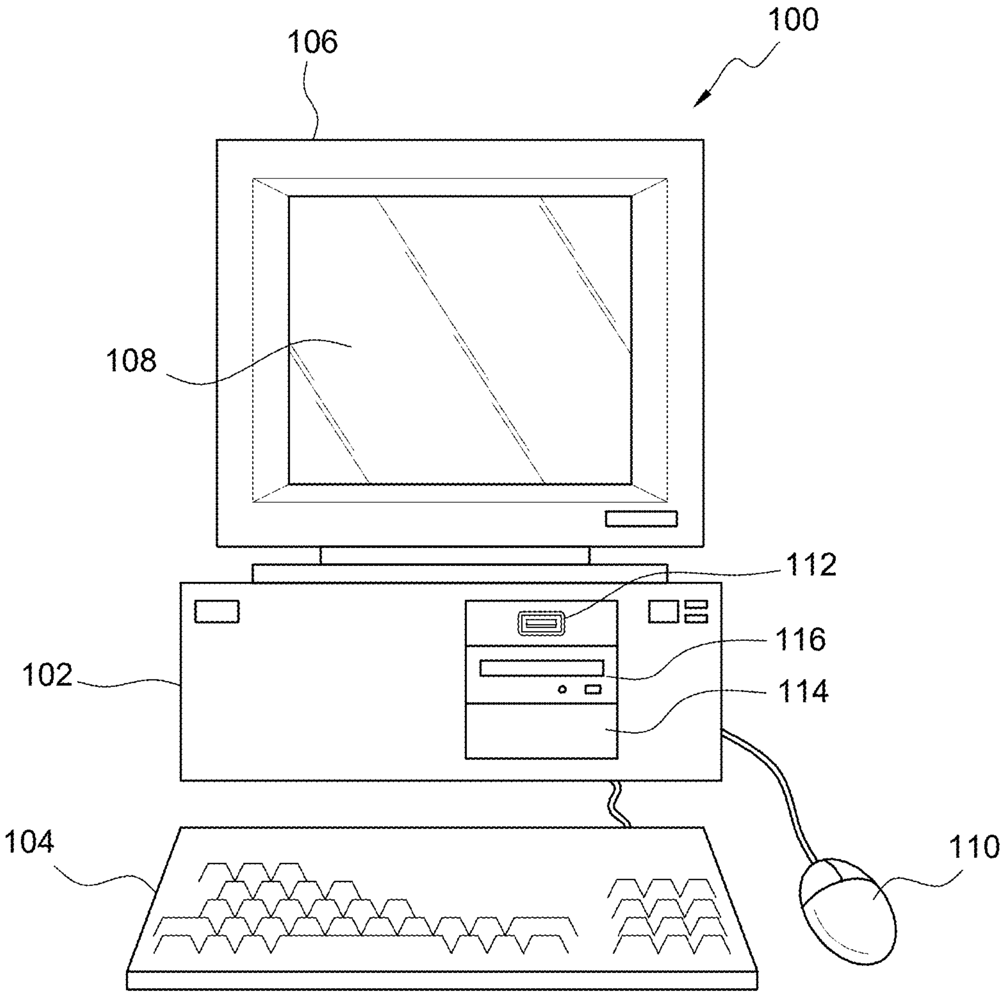
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds, for example.

DESCRIPTION OF EXAMPLES OF EMBODIMENTS

In several embodiments, the systems and methods described herein can provide for managing state data in a user interface (UI) application. The techniques described herein can provide for transforming relational data into a graph data structure, consisting of vertices and edges, to represent the state data in a different relational structure on the client-side of a web application. This transformation can allow for efficient traversal to locate related data and can allow for efficient design of web applications with data models that different from the data models stored in database on the server.

Various embodiments include a computer-implemented method. The method can include, upon launch of a browser session on a client-side web application, obtaining state data in a first relational structure from a database of a server. The method also can include generating, at the client-side web application, a graph comprising vertices and edges to represent the state data in a second relational structure. The second relational structure of the graph can be different from the first relational structure. The client-side web application can be configured to perform data operations on the state data using the graph.

A number of embodiments include a system including one or more processors and one or more non-transitory computer-readable media storing computing instructions that, when executed on the one or more processors, cause the one or more processors to perform various operations. The operations can include, upon launch of a browser session on a client-side web application, obtaining state data in a first relational structure from a database of a server. The operations also can include generating, at the client-side web application, a graph comprising vertices and edges to represent the state data in a second relational structure. The second relational structure of the graph can be different from the first relational structure. The client-side web application can be configured to perform data operations on the state data using the graph.

Some embodiments include one or more non-transitory computer-readable media storing computing instructions that, when executed on one or more processors, cause the one or more processors to perform various operations. The operations can include, upon launch of a browser session on a client-side web application, obtaining state data in a first relational structure from a database of a server. The operations also can include generating, at the client-side web application, a graph comprising vertices and edges to represent the state data in a second relational structure. The second relational structure of the graph can be different from the first relational structure. The client-side web application can be configured to perform data operations on the state data using the graph.

Figure 2:
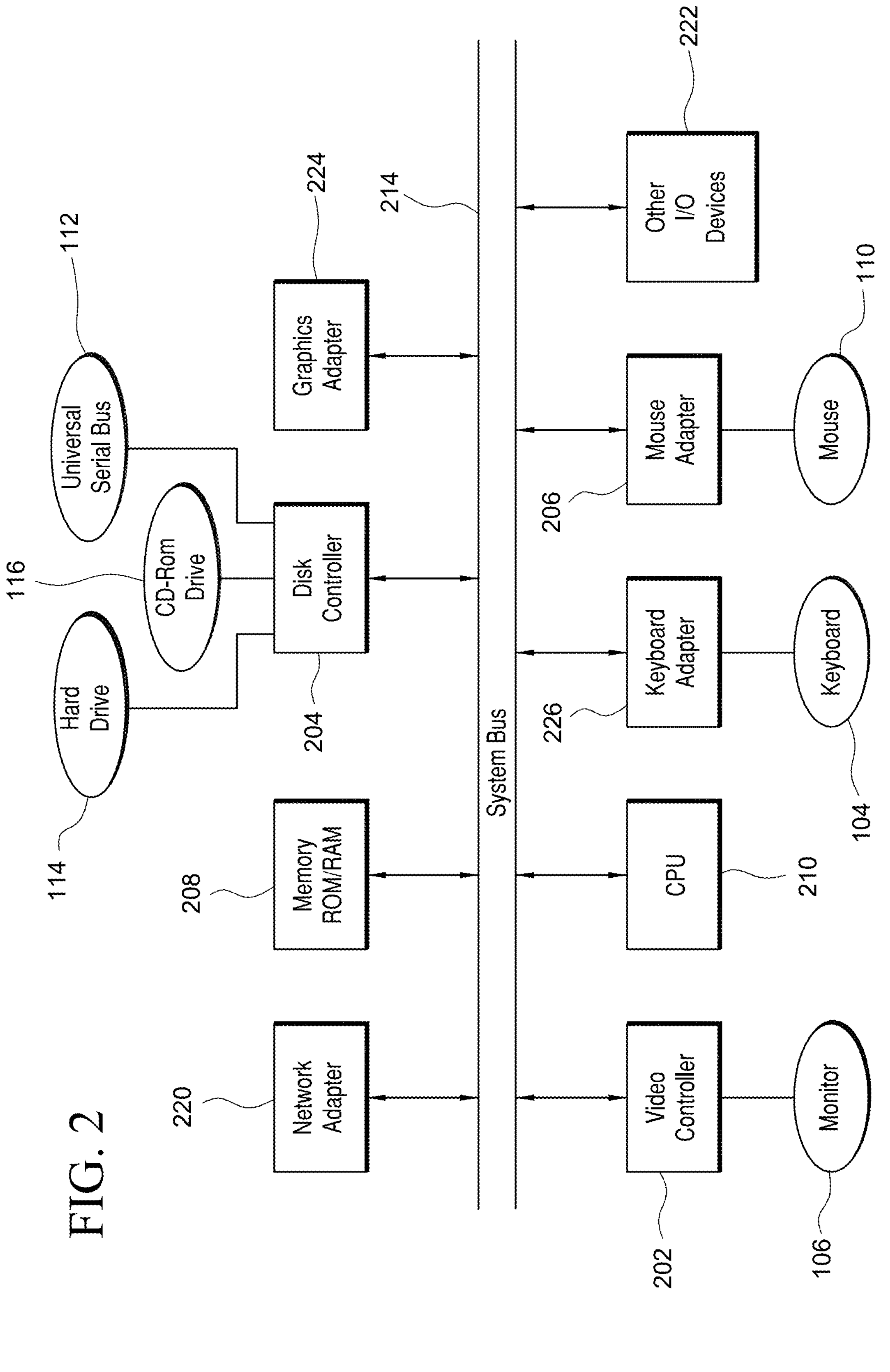
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or DVD, Blu-Ray, or other suitable media, such as media configured to be used in DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG.

1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a DVD in DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general-purpose computer to a special purpose computer. For purposes of illustration, programs and other executable program components are shown herein as discrete systems, although it is understood that such programs and components may reside at various times in different storage components of computer system 100 and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
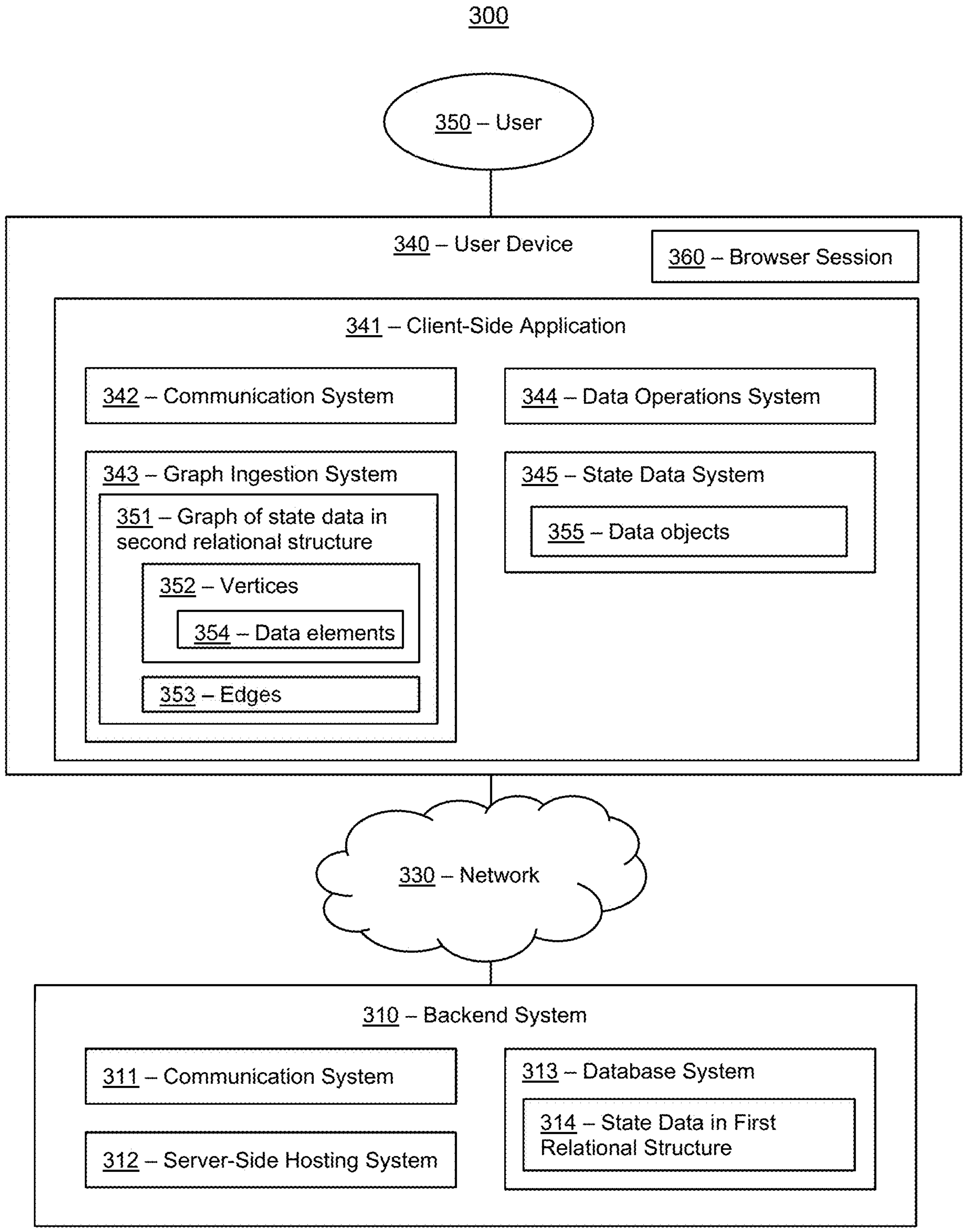
FIG. 3 illustrates a block diagram of a system that can be employed for graph-based state management in client-side web applications, according to an embodiment.

Turning ahead in the drawings, FIG. 3 illustrates a block diagram of a system 300 that can be employed for graph-based state management in client-side web applications, according to an embodiment. System 300 is merely exemplary, and embodiments of the system are not limited to the embodiments presented herein. The system can be employed in many different embodiments or examples not specifically depicted or described herein. In some embodiments, specific elements, modules, or systems of system 300 can perform various procedures, processes, and/or activities. In other embodiments, the procedures, processes, and/or activities can be performed by other suitable elements, modules, or systems of system 300. In some embodiments, system 300 can include a backend system 310, one or more user devices 340, and/or a network 330. A client-side application 341 can run on each user device 340. Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Backend system 310 can be a computer system, such as computer system 100 (FIG. 1), as described above, and can be a single computer, a single server, or a cluster or collection of computers or servers, or a cloud of computers or servers. In another embodiment, a single computer system can host backend system 310. In some embodiments, user device 340 can be in data communication through network 330 (e.g., the Internet or another suitable network) with backend system 310. In a number of embodiments, user devices 340 can be used by users, such as a user 350. In many embodiments, user device 340 can host a client-side application 341 that provides an interactive user interface for user 350 to engage with the web application. For example, backend system 310 can include a server-side hosting system that hosts a server-side of the web application, and client-side application 341 can be the client-side of the web application operating on user device 340.

User devices 340 can be computer systems, such as computer system 100 (FIG. 1), as described above. In some embodiments, user devices 340 can be desktop computers, laptop computers, mobile devices, and/or other endpoint devices used by one or more users (e.g., user 350). A mobile device can refer to a portable electronic device with the capability to present audio and/or visual data (e.g., text, images, videos, music, etc.). For example, a mobile device can include at least one of a smartphone, a personal digital assistant, a handheld digital computer device (e.g., a tablet), a laptop computer device, a wearable user computer device, or another portable computer device with the capability to present audio and/or visual data. Thus, in many examples, a mobile device can include a volume and/or weight sufficiently small as to permit the device to be easily conveyable by hand.

Exemplary mobile devices can include (i) an iPhone®, iPad®, MacBook® or similar product by Apple Inc. of Cupertino, California, United States of America, and/or (ii) a Galaxy™ or similar product by the Samsung Group of Samsung Town, Seoul, South Korea. Further, in the same or different embodiments, a mobile device can include an electronic device configured to implement one or more of (i) the iOS® operating system by Apple Inc. of Cupertino, California, United States of America, or (ii) the Android™ operating system developed by the Open Handset Alliance.

In many embodiments, backend system 310 and/or user device 340 can each include one or more input devices (e.g., one or more keyboards, one or more pointing devices such as a computer mouse, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG.

1). Further, one or more of the display device(s) can be similar or identical to monitor 106 (FIG. 1) and/or screen 108 (FIG. 1). The input device(s) and the display device(s) can be coupled to user device 340 in a wired manner and/or a wireless manner, and the coupling can be direct and/or indirect, as well as locally and/or remotely.

In some embodiments, backend system 310 can include a communication system 311, server-side hosting system 312, a database system 313, and/or other suitable systems and/or databases. In many embodiments, the systems of backend system 310 can be modules of computing instructions (e.g., software modules) stored at non-transitory computer readable media that operate on one or more processors. In the same or other embodiments, one of more of the systems of backend system 310 can be implemented in hardware. The systems of backend system 310 described herein are merely exemplary, and other suitable arrangements of systems within backend system 310 are contemplated.

In many embodiments, database system 313 of backend system 310 can include a server-side database that stores state data in a first relational structure (314) Database system 313 can include a structured (e.g., indexed) collection of data and can be managed by any suitable database management systems configured to define, create, query, organize, update, and manage database(s). Exemplary database management systems can include MySQL Database, PostgreSQL Database, Microsoft SQL Server Database, Oracle Database, SAP Database, and IBM DB2 Database.

Examples of state data include user preferences, session information, application settings, and/or other suitable application-specific data. In the context of web applications, state management involves tracking changes to the state and rendering the user interface to reflect these changes. In the case of large-scale, data-intensive applications, the state can include a vast amount of data from various sources. Relational databases are commonly used for storing and managing data in web applications. These databases organize data into tables, with each table representing a different entity or concept. The tables are interconnected through relationships, allowing for complex queries and data manipulations. The structure of a relational database is typically rigid, with a predefined schema that outlines the tables and their relationships. In client-side web applications, data from the server-side database is often fetched and used to generate the user interface. This data is typically structured in a way that mirrors the structure of the server-side database. However, this structure may not be the ideal structure for the client-side application, particularly when it comes to managing the application state.

Meanwhile, in many embodiments, user device 340 can include or be in data communication with one or more data stores, such as a state data system 345. State data system 345 can store inputs, constraints, data structures, outputs, and/or other suitable information. State data system 345 can be stored on one or more memory storage units (e.g., non-transitory computer readable media), which can be similar or identical to the one or more memory storage units (e.g., non-transitory computer readable media) described above with respect to computer system 100 (FIG. 1). In many embodiments, as described below, a graph can be used to store relationships among the data stored in state data system 345.

Meanwhile, communication system 311 of backend system 310 can communicate with a communication system 342 of client-side application 341 running on user device 340. Communication between user device 340 and backend system 310, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless USB, Z-Wave, etc.; exemplary LAN and/or WAN protocol(s) can include Ethernet, WiFi, etc.; and exemplary wireless cellular network protocol(s) can include GSM, GPRS, CDMA, EV-DO, EDGE, UMTS, DECT, Digital AMPS, iDEN, HSPA+, LTE, WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, user device 340 can include communication system 342, a graph ingestion system 343, a data operations system 344, a state data system 345, and/or other suitable systems and/or databases. In many embodiments, the systems of user device 340 can be modules of computing instructions (e.g., software modules) stored at non-transitory computer readable media that operate on one or more processors. In the same or other embodiments, one of more of the systems of user device 340 can be implemented in hardware. The systems of user device 340 described herein are merely exemplary, and other suitable arrangements of systems within user device 340 are contemplated.

Figure 4:
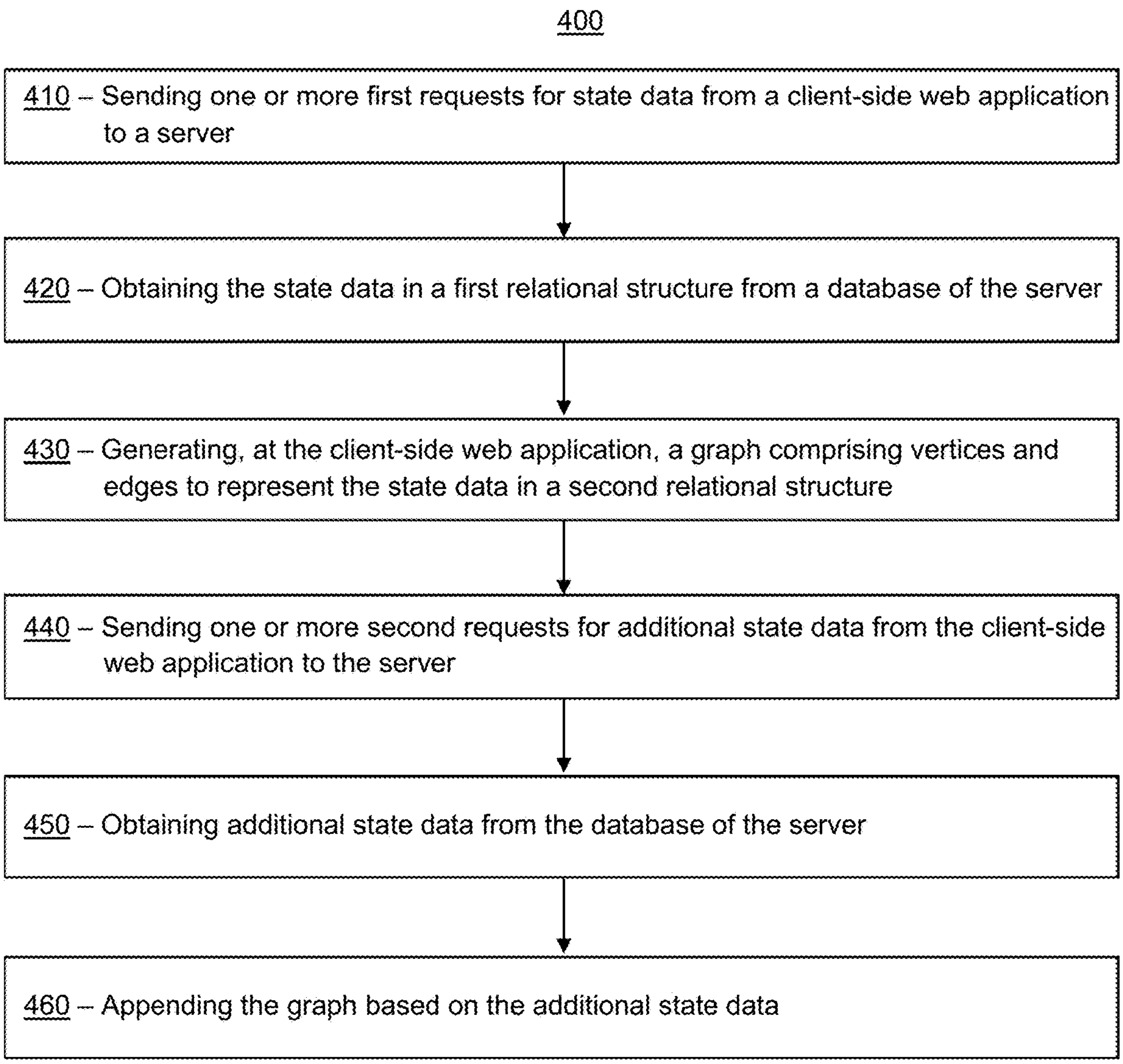
FIG. 4 illustrates a flowchart of a method for managing state data in client-side web applications.

Turning ahead in the drawings, FIG. 4 illustrates a flowchart of a method 400 for managing state data in client-side web applications. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), user device 340 (FIG. 3), and/or client-side application 341 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

Referring to FIG. 4, method 400 can include an activity 410 of sending one or more first requests for state data from a client-side web application to a server. The client-side web application can be similar or identical to client-side application 341 (FIG. 3). The server can be similar or identical to backend system 310 (FIG. 3). In some cases, upon launch of a browser session (e.g., 360 (FIG. 3) on the client-side web application, the firsts requests can be made for state data from a database of the server. The database can be similar or identical to database system 313 (FIG. 3). In some embodiments, activity 410 can involve requesting a subset of data stored in the database, which can allow for efficient data retrieval and can minimize unnecessary data transfer. In many embodiments, activity 410 can be performed by communication system 342.

In some embodiments, upon the initiation of a browser session, the client-side web application may be configured in activity 410 to request a strategically selected subset of the state data from the database system of the server. This approach is particularly advantageous in scenarios where the complete set of state data is voluminous and not all of it is immediately relevant to the user's current context or intended interactions with the web application. By requesting a subset of the state data, the client-side web application can reduce the initial load time, conserve bandwidth, and enhance the user experience by focusing on the data that is pertinent to the immediate context of the session. The subset of state data requested may be determined based on various factors, such as the user's role, permissions, initial top-level portions of the data, or the specific features of the web application that the user is likely to engage with during the session. In some embodiments, the client-side web application may employ predictive algorithms or machine learning models to anticipate the state data that may be used by the user interface to address the actions of the user, thereby optimizing the subset of data requested. This predictive approach can be continuously refined based on the user's interaction patterns over time, leading to increasingly efficient state data management. In some cases, the client-side web application can be configured to incrementally request additional portions of the state data as the user navigates through the web application. This dynamic retrieval strategy can advantageously result in the state data within the client-side application remaining lean and relevant, thereby maintaining high performance and responsiveness of the web application throughout the user's browser session.

In a number of embodiments, method 400 also can include an activity 420 of obtaining state data in a first relational structure from the database of the server. In many embodiments, activity 420 can be performed by communication system 342. As an example, the state data can be received at the client-side web application from the database of the server. In some embodiments, the first relational structure of the state data obtained from the database of the server may include multiple layers of nesting, which allows for a complex and detailed representation of the state data, accommodating various relationships and dependencies among the data elements. For instance, in a music database, the first relational structure may include several layers such as albums, songs, artists, composers, and other related entities. Each layer may represent a different model of the music data, with the albums layer containing information about various music albums, a songs layer listing individual tracks in the album, an artist layer for the artists who created the music, etc.

In this example, the albums model may include records for each album, with fields such as album title, release date, genre, and IDs of the songs related to the album. The song model may include records for each song, with fields such as song title, duration, ID of the album it belongs to, and IDs of the artist(s) that performed it. The artist model may contain records for each artist, with fields such as artist name, birthdate, nationality, and IDs of the songs they have performed. A relational structure with layers representing these models allows for queries that can join data across these layers, such as finding all songs by a particular artist or all albums that contain a specific song.

The nesting of data in the first relational structure can be used for organizing and managing complex data sets where entities are interrelated. However, this structure may not be the ideal structure for the client-side application, particularly when it comes to managing the application state when the client-side web application uses a different data model. In the example of the music database, the data model of the first relational structure in the database of the server may specify that albums belong to artists, and the levels of nesting in the first data structure can be structured accordingly. However, the data model used by the client-side web application may specify that albums belong to composers, not artists, so that nesting structure in the first data structure does not work well with the data model for the client-side web application.

In several embodiments, method 400 additionally can include an activity 430 of generating a graph for the state data, comprising vertices and edges to represent the state data in a second relational structure (e.g., 351 (FIG. 3)). In many embodiments, activity 430 can be performed by graph ingestion system 343 (FIG. 3). The client-side web application can generate the graph for the state data, with the vertices and edges representing the state data in the second relational structure. Activity 430 can transform the state data from its original relational structure (i.e., the first relational structure) in the database to a graph structure, facilitating efficient data operations on the client-side web application. The graph can model relations between data elements (e.g., 354 (FIG. 3)). The graph is made up of vertices (also called nodes) (e.g., 352 (FIG. 3)), which are connected by edges (e.g., 353 (FIG. 3)). Each vertex of the graph can represent a data element of the state data, and the edges can represent the relationships between these data elements. This graph structure provides a flexible and intuitive way of representing the relationships between the state data of an application, and can facilitate efficient data operations such as searching, updating, and traversing the state.

In some embodiments, the graph can be a tree in which the edges are directed edges. This configuration allows for a clear and organized representation of the relationships between data elements, in which the graph can be traversed by moving up or down levels of the tree. In other embodiments, other graph topologies can be used. In some embodiments, the graph can be stored on the user device running the client-side web application, such as in state data system 345 (FIG. 3). In some embodiments, the graph may be generated at the time the browser session launches, and, in some embodiments, can last for the duration of the browser session, after which the graph can be deleted once the browser session ends. In some embodiments, the graph can be regenerated upon refresh of the browser session and/or each time the browser session loads or is launched.

In many embodiments, the specific structure of the graph can be specified by the client-side web application. Upon ingestion of the state data, the data elements of the state data obtained in the first relational structure can be determined. The graph can be generated using these data elements, but the relational structure of the graph can be significantly different from the first relational structure obtained from the database of the server. For example, a data element for an album can be stored in a vertex of the graph, and that vertex can be linked to another vertex that stores a data element for a composer of that album, even though the first relational structure obtained the database of the server included nested levels with a level for the artist at the level immediately below the level for the album.

In some embodiments, each respective data element of the state data can be represented by a respective unique identifier (ID) stored in a respective vertex of the vertices. Using unique IDs can provide for efficient identification and retrieval of data elements within the graph and/or can allow for a straightforward mapping between data elements in the first relational structure from the database of the server and the second relational structure of the graph at the client-side web application. Through component-based design, the change of the structure of the state data in the database or the change of the front-end data structure does not change the other side's data structure. Instead, on ingestion, the front-end web application can infer the relationships for the state date from the graph structure specified by the data model of the front-end web application. For example, if the data model in the front-end web application specifies that albums belong to composers instead of artists, the generation of the graph will add the albums and the composers to vertices, and will create edges between vertices for the albums and artists to model this relationship.

In many embodiments, the unique ID can be used as a key to a hashmap that links to a data object store (e.g., data objects 355 (FIG. 3)), which can be stored in state data system 345 (FIG. 3). The hashmap can provide a quick lookup to access the underlying data from the graph. For example, the data object can include attributes of the data, such as how many times a button is click on the user interface, or the name of the album in the music database example. The graph can be used to represent the relationships between the data elements, and to readily navigate between these data elements in the data model specified by the client-side web application.

By using the graph, the client-side web application can navigate the data elements in a form that matches the data model used on the client-side, even when this data model is different from the data model used in the database of the server. These techniques can beneficially allow the developers of the client-side web application to use different data models than those on the server side, and to change the data models without changing the data model on the server side. These techniques have dramatically reduced the amount of code written on the client-side to manage state data, such as by a 60-70% reduction in code, as the client-side web application can be developed without needing to match the structure of the database, but instead using the unique IDs to represent the data. Further, the amount of software defects on the client-side has significantly decreased using by using these techniques.

In some embodiments, the client-side web application can perform data operations on the state data using the graph. In some embodiments, the data operations can be performed by data operations system 344 (FIG. 3) and/or state data system 345 (FIG. 3). The data operations can include read operations and/or mutation operations, such as create, update, and delete operations. The client-side web application can be configured to perform the read operation for a respective data element of the state data by accessing the respective unique ID for the respective data element from the respective vertex of the graph associated with the respective data element, and performing a lookup in a map for the respective data element using the respective unique ID as a key to the hashmap to access a respective data object associated with the respective data element.

For mutation operations, the client-side web application can be configured to modify the graph based on the mutation operation. For instance, the client-side web application can be configured to create a vertex of the graph when the mutation operation is a create operation. This create operation can allow for the addition of new data elements to the state data and their corresponding representation in the graph. The client-side web application can be configured to remove a vertex of the graph when the mutation operation is a delete operation. This delete operation can allow for the removal of data elements from the state data and their corresponding representation in the graph. The client-side web application can be configured to update a data element of the state data associated with a vertex of the graph when the mutation operation is an update operation. The update operation can enable the modification of existing data elements in the state data and/or their corresponding representation in the graph.

In some embodiments, when the data element is updated at the client-side web application, an update is performed to a corresponding data element in the state data in the database of the server. Changes made to the state data on the client-side can be reflected in the backend system (e.g., 310), which can maintain consistency between the client-side and server-side data. A web socket can be used for the real-time data application to ensure that data updates on the client-side are pushed to the back-end server. In many embodiments, the client-side web applications on the user devices can be configured to listen for updates made to one or more elements of the state data in the database of the server and/or can make corresponding updates to the one or more elements of the state data at the client-side web applications. This approach can provide for real-time synchronization of data between the server and the client-side applications, across all the users, to keep the state data represented in the graph is up-to-date. For example, if one user updates the name of the artist in the music database from Jimi Hendrix to Bob Marley, the update can be made by the client-side web application using the graph, and the update can be pushed to the server. Then, the server can propagate the update to the client-side web applications. In many embodiments, the client-side web application can be configured to listen for updates from the server-side hosting system (e.g., 312) using a publish-subscribe messaging model. This approach can allow the client-side web application to receive real-time notifications of changes made to the state data in the backend system, facilitating real-time updates to the graph and the state data system for data elements based on the unique ID of each data element.

In a number of embodiments, method 400 further can include an activity 440 of sending second requests for additional state data from the client-side web application to the server. In many embodiments, activity 440 can be performed by communication system 342. For example, as described above, the initial requests for state data can be limited to a subset of the state data, and once the user interacts with the user interface provided by the client-side web application in various ways, the client-side web application can request additional state data from the server.

In several embodiments, method 400 additionally can include an activity 450 of obtaining additional state data from the database of the server. In many embodiments, activity 450 can be performed by communication system 342. The additional state data obtained in activity 450 can be received at the client-side web application from the server.

In a number of embodiments, method 400 further can include an activity 460 of appending the graph with the additional state data. In many embodiments, activity 460 can be performed by graph ingestion system 343 (FIG. 3). Activities 440, 450, and 460 can beneficially provide dynamic addition of data to the graph as the user interacts with the client-side web application, to update the graph and the state data it represents additional state data from the server.

In many embodiments, the techniques described herein can beneficially provide several technical advantages. State management of a user interface (UI) plays a significant role in handling dynamic data interactions within applications, enabling the creation of highly interactive and modern applications. As codebases scale, the complexity of state management increases. Numerous solutions exist for native and web UI development, emphasizing API functionality for data changes and retrieval, yet often overlooking the aspect of data storage. In developing web applications with a complex, relational schema featuring multiple data layers, there is significant benefit to using the techniques described herein to manage the state data in a manner that allows for scalability, ease-of-use, and performance of a state.

The techniques described herein can seamlessly integrate with any state management solution. They can transform relational data into a graph data structure, enabling efficient traversal to locate related data, addressing the challenge of triggering multiple UI updates for changes in one data attribute. In many embodiments, these techniques can offer three generalized mutative operations—create, update, and delete—applicable uniformly across various data models. By utilizing unique IDs, these techniques can update associated data, to achieve automatic propagation of changes to dependent UI elements. In real-time applications with concurrent users, these techniques can handle data flow seamlessly, automatically determining associated mutative operations and facilitating automatic graph and UI propagations. The techniques thus enhance the performance, reliability, and scalability of UI development in large-scale enterprise applications. The generalizability of these techniques can allow them to be applicable across diverse use case.

Although the methods described above are with reference to the illustrated flowchart, it will be appreciated that many other ways of performing the activities associated with the method can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although graph-based state management system for web applications has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:

upon launch of a browser session on a client-side web application running on a user device, obtaining, at the client-side web application, state data in a first relational structure from a database of a server over a network, wherein the server is separate from the user device; and generating, at the client-side web application, a graph comprising vertices and edges to represent the state data in a second relational structure such that a structure of the state data is transformed from the first relational structure obtained from the server into the second relational structure, wherein the second relational structure of the graph is different from the first relational structure, and the client-side web application is configured to perform data operations that modify the state data in the second relational structure using the graph instead of the state data in the first relational structure.

2. The computer-implemented method of claim 1 further comprising, before obtaining the state data:

sending one or more first requests for the state data from the client-side web application to the server.

3. The computer-implemented method of claim 2, wherein the one or more first requests for the state data collectively request a subset of data stored in the database.

4. The computer-implemented method of claim 1 further comprising, after generating the graph:

sending one or more second requests for additional state data from the client-side web application to the server;

obtaining additional state data from the database of the server; and appending the graph based on the additional state data.

5. The computer-implemented method of claim 1, wherein each respective data element of the state data is represented by a respective unique ID stored in a respective vertex of the vertices.

6. The computer-implemented method of claim 5, wherein:

the data operations comprise a read operation; and the client-side web application is configured to perform the read operation for a respective data element of the state data by:

accessing the respective unique ID for the respective data element from the respective vertex of the graph associated with the respective data element; and performing a lookup in a hashmap for the respective data element using the respective unique ID as a key to the hashmap to access a respective data object associated with the respective data element.

7. The computer-implemented method of claim 1, wherein the graph comprises a tree in which the edges are directed edges.

8. The computer-implemented method of claim 1, wherein:

the data operations comprise a mutation operation comprising one of a create operation, an update operation, or a delete operation; and the client-side web application is configured to modify the graph based on the mutation operation.

9. The computer-implemented method of claim 8, wherein the client-side web application is configured to create a vertex of the graph when the mutation operation is a create operation.

10. The computer-implemented method of claim 8, wherein the client-side web application is configured to remove a vertex of the graph when the mutation operation is a delete operation.

11. The computer-implemented method of claim 8, wherein the client-side web application is configured to update a data element of the state data associated with a vertex of the graph when the mutation operation is an update operation.

12. The computer-implemented method of claim 11, wherein, when the data element is updated at the client-side web application, an update is performed to a corresponding data element in the state data in the database of the server.

13. The computer-implemented method of claim 1, wherein the client-side web application is configured to listen for updates made to one or more elements of the state data in the database of the server and make corresponding updates to the one or more elements of the state data at the client-side web application.

14. The computer-implemented method of claim 1, wherein the client-side web application is configured to listen for updates from the server using a publish-subscribe messaging model.

15. The computer-implemented method of claim 1, wherein the graph is stored on the user device running the client-side web application.

16. The computer-implemented method of claim 1, wherein the graph is regenerated on refresh of the browser session.

17. The computer-implemented method of claim 1, wherein the graph is deleted at an end of the browser session.

18. The computer-implemented method of claim 1, wherein the first relational structure comprises multiple layers of nesting.

19. A system comprising one or more processors and one or more non-transitory computer-readable media storing computing instructions that, when executed on the one or more processors, cause the one or more processors to perform operations comprising:

upon launch of a browser session on a client-side web application running on a user device, obtaining, at the client-side web application, state data in a first relational structure from a database of a server over a network, wherein the server is separate from the user device; and generating, at the client-side web application, a graph comprising vertices and edges to represent the state data in a second relational structure such that a structure of the state data is transformed from the first relational structure obtained from the server into the second relational structure, wherein the second relational structure of the graph is different from the first relational structure, and the client-side web application is configured to perform data operations that modify the state data in the second relational structure using the graph instead of the state data in the first relational structure.

20. One or more non-transitory computer-readable media storing computing instructions that, when executed on one or more processors, cause the one or more processors to perform operations comprising:

upon launch of a browser session on a client-side web application running on a user device, obtaining, at the client-side web application, state data in a first relational structure from a database of a server over a network, wherein the server is separate from the user device; and generating, at the client-side web application, a graph comprising vertices and edges to represent the state data in a second relational structure such that a structure of the state data is transformed from the first relational structure obtained from the server into the second relational structure, wherein the second relational structure of the graph is different from the first relational structure, and the client-side web application is configured to perform data operations that modify the state data in the second relational structure using the graph instead of the state data in the first relational structure.

* * * * *